United States Patent [19]
Andreasen

[11] Patent Number: 4,921,806
[45] Date of Patent: May 1, 1990

[54] TRAY ASSEMBLY FOR GERMINATION FLOOR

[76] Inventor: Norman Andreasen, 1520 W. Norwood Ave., Itasca, Ill. 60143

[21] Appl. No.: 414,330

[22] Filed: Sep. 29, 1989

Related U.S. Application Data

[62] Division of Ser. No. 248,312, Sep. 19, 1988.

[51] Int. Cl.$^5$ .............................................. E01H 5/07
[52] U.S. Cl. ...................................... 435/302; 34/237
[58] Field of Search .................. 435/301, 302; 34/237, 34/238; 52/177, 180, 483, 487, 664, 668

[56] References Cited

U.S. PATENT DOCUMENTS

| 80,110 | 7/1868 | Arnold | 34/237 |
| 233,301 | 10/1880 | Toepfer | 34/237 |
| 264,700 | 9/1882 | Hughes | 34/237 |

FOREIGN PATENT DOCUMENTS 14319 of 1887 United Kingdom .................. 34/237

Primary Examiner—Carroll B. Dority
Attorney, Agent, or Firm—Edward D. Gilhooly

[57] ABSTRACT

A tray assembly for a germination floor assembly having a perforation tray sheet affixed to a rectangular frame assembly. The frame assembly includes a pair of parallel side members interconnected by a pair of end cross frame members. A plurality of longitudinal ribs extend parallel to the side members between the cross frame members. Reinforcing cross bars further extend between the side members and the longitudinal ribs. The cross frame members and reinforcing cross bars have a unique configuration to provide unimpeded flow of liquid wash through the tray assembly during cleaning. A tray assembly is attached to an adjacent tray by a bolt assembly. The tray assembly may be attached to supporting I-beams by hold down clamps. In one embodiment risers are employed for enhanced free flow of liquid wash during cleaning.

5 Claims, 6 Drawing Sheets

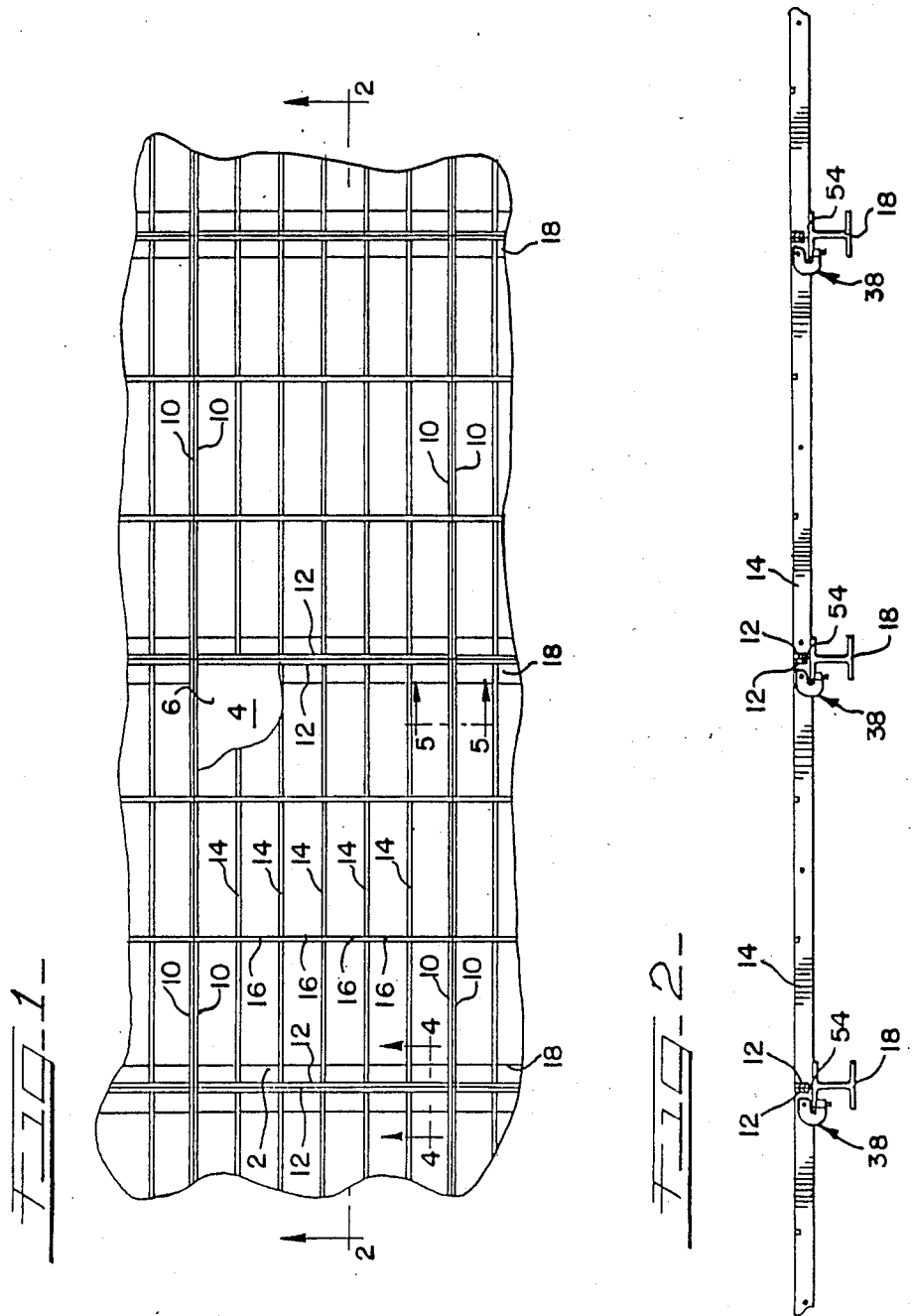

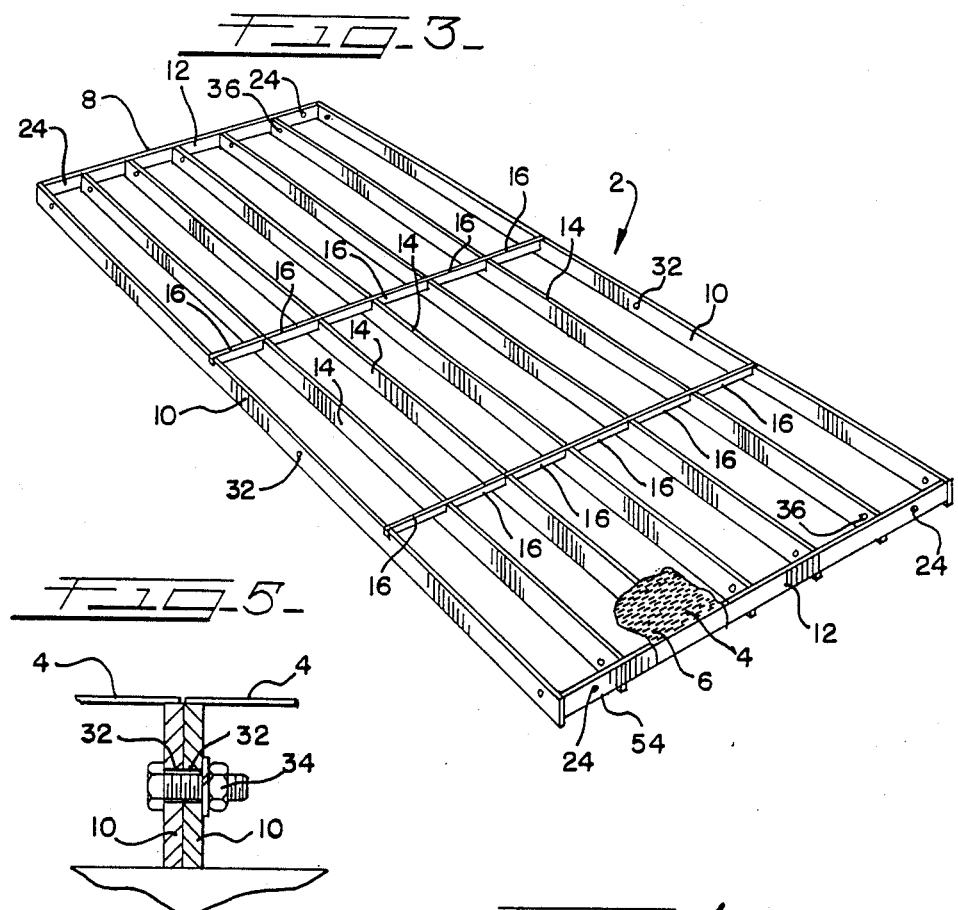
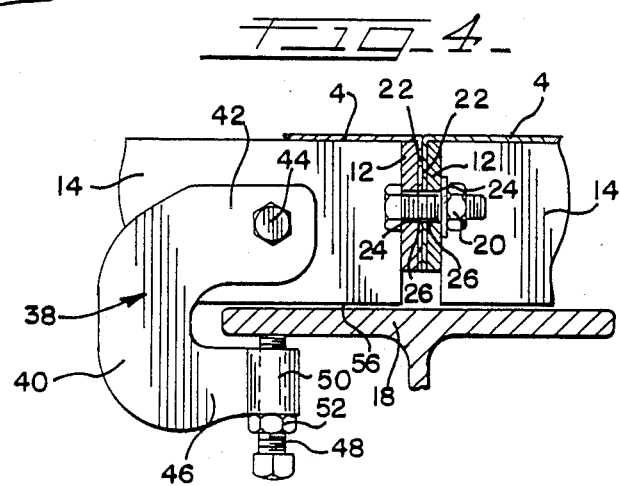

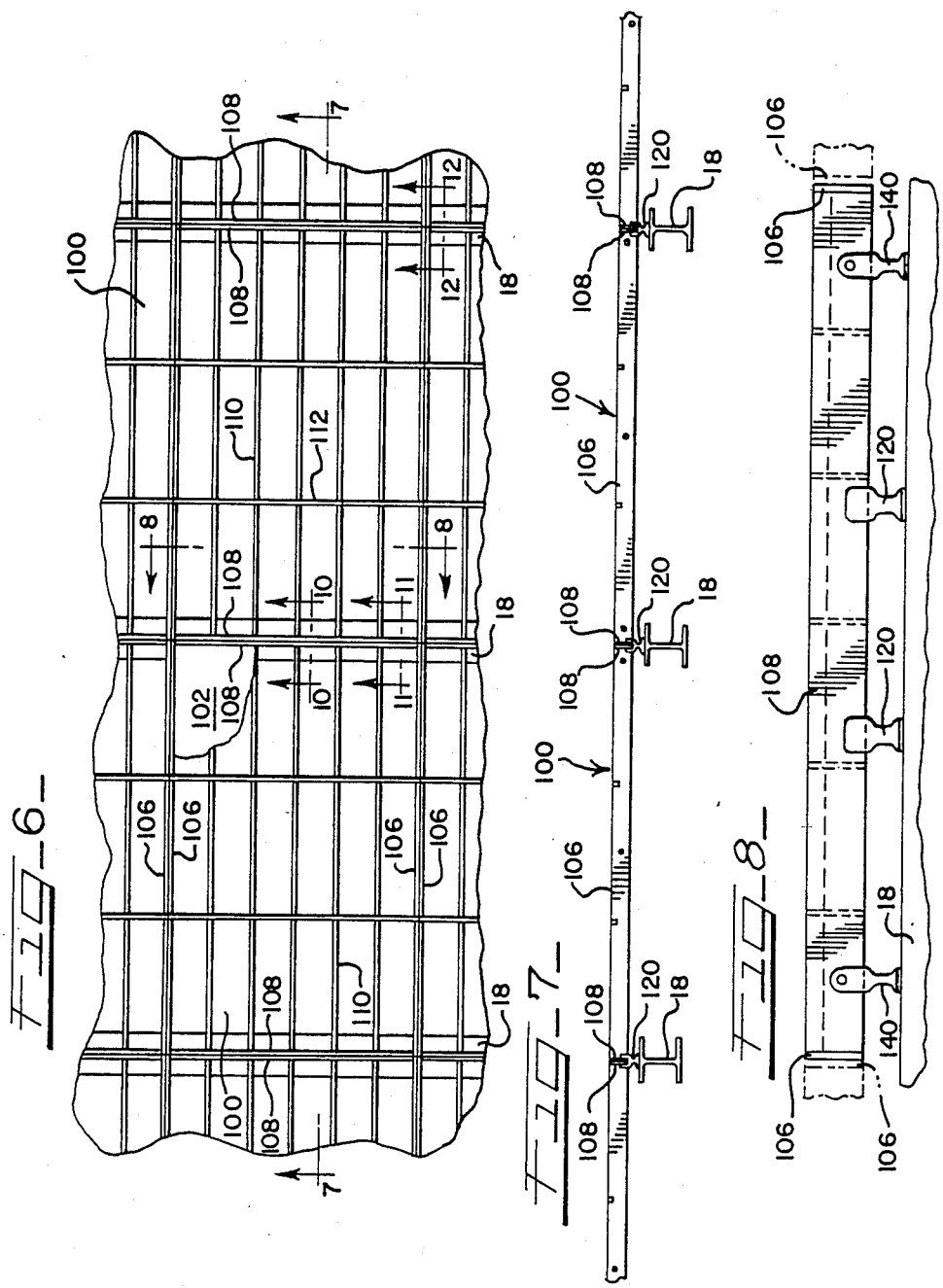

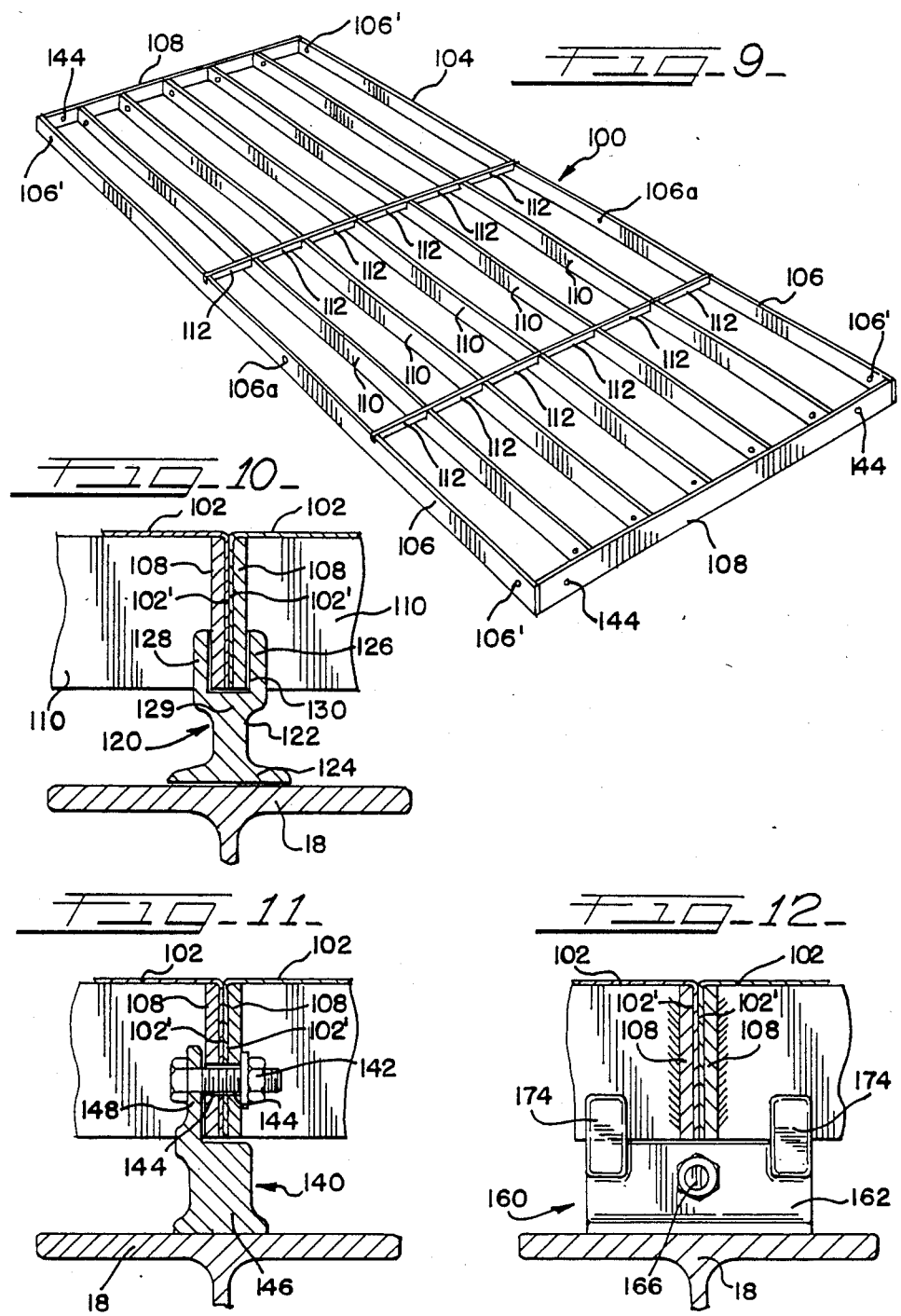

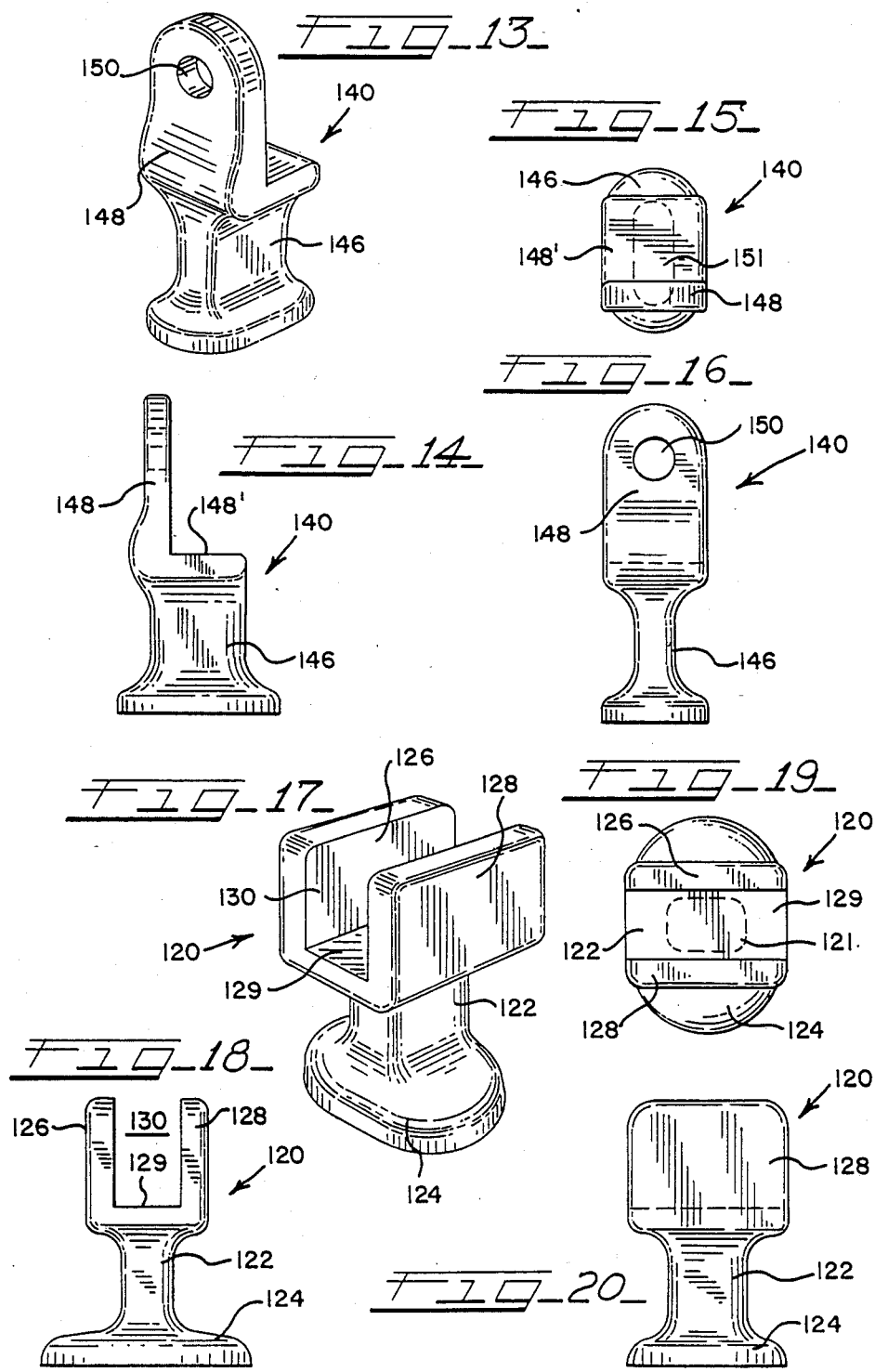

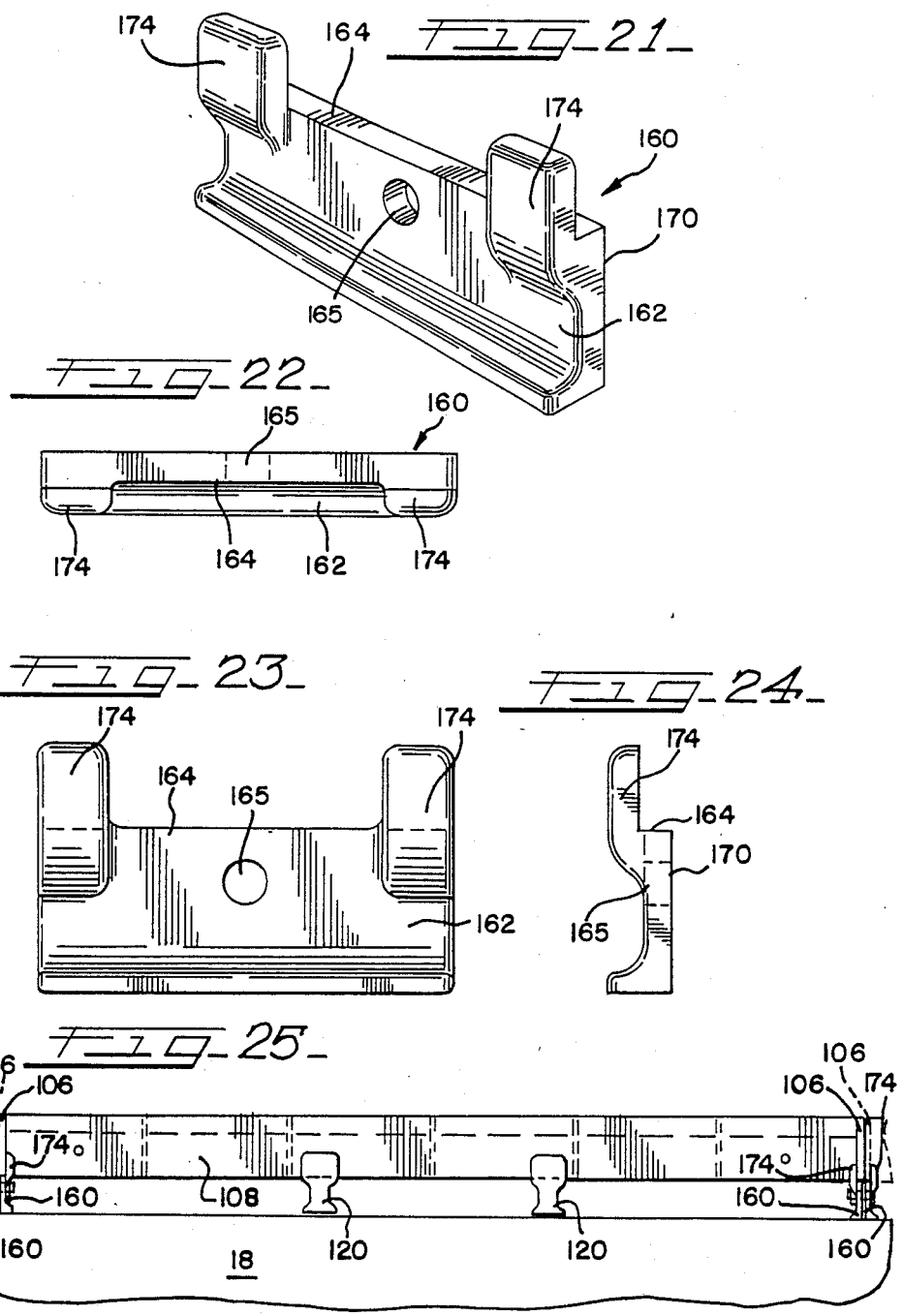

TRAY ASSEMBLY FOR GERMINATION FLOOR

This is a division of application Ser. No. 248,312, filed Sept. 19, 1988.

BACKGROUND OF THE INVENTION

1. Field of the Invention

This invention relates to germination compartments for germinating grain and, more particularly, to germination tray assemblies forming the floor in a germination compartment.

2. Description of the Prior Art

Germination compartments have long been used to germinate grain in a process called malting. The grain is placed on a plurality of perforated trays forming a floor assembly and are subjected to germination by controlled temperature and humidity in the compartment.

A major problem in the malting process is the control of contamination and unwanted residue, which must be removed after each three or four day germination cycle, using clear water and then treating the germination area with a clorine water solution to reduce unwanted bacterial growth. The fragrance of germinating malt in a clean, well maintained germination compartment is pleasant, whereas the stench in a compartment poorly cleaned or maintained is pungent and very offensive.

The prior floor structure, devised about 1900 to 1910, and still commonly used today, has many undesirable features making it extremely difficult to clean properly and must be treated with a heavy solution of clorine and water. In the prior art the frame structure for each perforated tray is constructed of a steel channel, outside peripheral members, and steel angle ribs extending across the width of the frame. A perforated sheet is attached to the top of the frame in an offset position so the overlap on two sides extends over the adjoining frame on a recessed surface provided. In prior times, the cleaning was less intensive and less expensive, unlike present day standards.

The old trays are freely placed on supporting I-beams where bacterial growth between the tray frames under the overlapping sheet and the hidden inaccessible pockets of the channels are major problem areas. The wash crew is required to perform under very adverse conditions in a subfloor chamber which has a 100% humidity and due to the offfall from the barley, gets very slippery after the three or four day germinating cycle. The angle ribs are difficult to clean on the underside surface. The configuration of the past tray frame provides nooks, cranies, pockets or cavities that serve as reservoirs for the accumulation of contamination and slime, which is detrimental to the growth and production of high quality malt during the germination cycle.

Another concern of maltsters with reference to germination trays is whether the floor assembly provides a sufficient open area for the passage of air and moisture during the germination process. In prior art, an individual tray assembly having a representative length of 120 inches and width of 44.5 inches, has approximately 37 square feet of area. Since the surface area of the frame components is 8.6875 square feet, 24% of the frame area is closed to free flow of air and humidity circulation.

The old trays also have unprotected tray sheets on the extended surfaces and are frequently damaged by the mechanical plow board used to remove the barley from the compartment floor after the germinating cycle. With the new unloading equipment now being devised to operate automatically unloading the germinated barley from the compartment floor, damage to trays is a serious consideration.

The prior designs also fail to provide a suitable system, both from the standpoint of suitable attachment to an adjacent tray assembly and from the desirability of being adequately affixed to the supporting beams in the germination compartment.

SUMMARY OF THE INVENTION

It is the objective of the invention to provide an improved tray assembly capable of providing enhanced cleaning after germination and better air flow during the germination cycle. The tray assembly of the invention further provides a rigid germination floor, when a plurality of tray assemblies are affixed together by a unique technique. Clamp means may also be used in accordance with the teachings herein to secure the floor to underlying support beams.

The tray assemblies of the invention are uniquely designed to provide cleaning access as there are no pockets or cavities where slime and contamination build up as in the prior art, such as between adjacent tray assemblies and within the closed frame and support members. The unprotected ends of adjacent tray sheets have been eliminated to provide a flat floor which is not subject to damage from plow boards or helical grain turning machines.

The tray assembly herein disclosed is stronger and stiffer and allows 0.060" thick stainless steel tray sheets, preferred by many maltsters, to be used. The floor area of the floor, despite its enhanced strength, has approximately 0.05% closed area in contrast to the approximate 24% of prior art tray assemblies. This permits greater flow during the germination process.

The frame structure of the invention supporting the tray sheet has passages and open areas through which cleaning wash can easily flow to eliminate the problems of slime and contaminants whereby cleaning can be quickly and effectively accomplished by a reduced work crew. Suitable cleaning can be achieved from above the floor, because of the unique configuration of the tray assembly permitting a free flow of wash liquid. Thereby, the cleaning crew requires minimal time and effort to clean in the less desireable sub-floor compartment.

BRIEF DESCRIPTION OF THE DRAWINGS

FIG. 1 is a top partial plan view with a portion of tray sheet shown of a first embodiment of a plurality of tray assemblies of the invention;

FIG. 2 is a partial side elevational view with parts in section of the plurality of tray assemblies taken along line 2—2 of FIG. 1;

FIG. 3 is a top perspective view of the frame of a tray assembly of FIG. 1;

FIG. 4 is a side plan view with parts in section of a portion of a tray assembly frame taken along line 4—4 of FIG. 1;

FIG. 5 is an end plan view with parts in section taken along line 5—5 of FIG. 1;

FIG. 6 is a top partial plan view with a portion of a tray sheet shown of another embodiment of a plurality of tray assemblies of the invention;

FIG. 7 is a partial side elevational view with parts in section of the plurality of tray assemblies taken along line 7—7 of FIG. 6;

FIG. 8 is a partial end elevational view of a first embodiment using riser members with the tray assemblies of FIG. 6;

FIG. 9 is a top perspective view of the frame of a tray assembly of FIG. 6;

FIG. 10 is a side elevational view with parts in section of a tray assembly riser taken along line 10—10 of FIG. 6;

FIG. 11 is a side elevational view with parts in section of a tray assembly riser at a bolt hole taken along line 11—11 of FIG. 6; and FIG. 12 is a side elevational view with parts in section of a riser block assembly at attachment locations between adjacent tray assemblies taken along line 12—12 of FIG. 6, FIG. 13 is a perspective front view of the riser shown in FIG. 11;

FIG. 14 is a side elevational view of the riser of FIG. 13;

FIG. 15 is a plane view of the riser of FIG. 13;

FIG. 16 is a front elevational view of the riser of FIG. 10;

FIG. 17 is a perspective front view of the riser of FIG. 10;

FIG. 18 is a side elevational view of the riser of FIG. 17;

FIG. 19 is a top plan view of the riser of FIG. 17;

FIG. 20 is a front elevational view of the riser of FIG. 17;

FIG. 21 is a front perspective view of one of the risers used at the position shown in FIG. 25;

FIG. 22 is a top plan view of the riser of FIG. 21;

FIG. 23 is a front elevational view of the riser of FIG. 21;

FIG. 24 is a side elevational view of the riser of FIG. 21.

FIG. 25 is a partial end elevational view of a second embodiment using alternative riser members with the tray assemblies of FIG. 6.

DESCRIPTION OF THE PREFERRED EMBODIMENTS

Referring now to FIGS. 1-5, there is illustrated the improved tray assemblies of the invention, generally designated by reference numeral 2, forming the floor of a germination compartment. The tray assemblies 2 include an upper tray sheet 4 having a plurality of perforations 6 and a supporting frame structure 8. The tray sheets 4 support the grain during malting and the perforations 6 permit the circulation of humid air through the floor during germination. The upper tray sheets 4 are affixed to a respective frame structure by spot welding and the like.

The frame structure 8 for each tray assembly consists of a pair of parallel side members 10 interconnected to each other at each end by a pair of cross frame members 12 as best seen in FIGS. 1 and 3. A plurality of spaced longitudinal ribs 14, for example, the five shown in FIG. 3, extend parallel to the side members 10 and span between cross frame members 14. A plurality of reinforcing bars 16 extend in two rows respectively between the side members 10 and an adjacent rib 14 and between adjacent ribs 14. The foregoing components of the frame structure 8 are fabricated from a metal and may be interconnected as a unit by a suitable attachment technique, such as welding.

The side members 10, cross frame members 12, ribs 14, and bars 16 all have a relatively narrow thickness in the plan view of FIG. 1 to insure nearly unimpeded flow of air or cleaning wash through the perforated tray sheet 4. The plurality of floor assemblies are carried by a plurality of substructure I-beams 18 supported on the walls (not shown) of the germination compartment. As best seen in FIGS. 2 and 4 the ends of adjacent tray assemblies are bolted together by bolt asssemblies 20 at the position of support of respective I-beams 18.

The end portions 22 of the tray sheet 4 of each tray assembly are bent down against the cross frame member 12 whereby the end portions 22 of adjacent tray sheet 4 are sandwiched between the cross members of adjacent frame members as best seen in FIG. 4. As seen in FIG. 3 a cross member 12 has a pair of holes 24 to receive a pair of bolt assemblies 20 at each end to end connection of tray assemblies 2. The bolt assemblies extend between adjacent cross frame members 12 through aligned holes 26 in the bent down end portion 22 of the tray sheets 4. The foregoing attachment technique eliminates the hidden pockets where slime and contamination buildup in prior art tray assemblies where the edge of tray sheet of one tray assembly overlaps the adjacent tray assembly. Further, the bent down portion 22 of the tray sheets 4 eliminates exposed free edges of tray sheets of prior germination floors and reduce the damage caused by grain turning machines or plows used in connection with the malting process. The bent down tray sheets 4 also provide a flatter floor with minumum deflection.

As best seen in FIG. 5, the adjacent tray assemblies 4 are attached in side by side relationship by bolt assemblies 30 positioned in the aligned holes 32 (FIG. 3) of adjacent side members 10. The previously described frame structure 8 and bolt interconnections of the tray assemblies provide enhanced rigidity and structural integrity to the germination floor. The side by side attachment by bolts 34 also eliminates undesirable pockets where slime and contaminants can build up.

As seen in FIG. 3, a pair of bolts holes are formed in each of the ribs include a pair of holes 36 for attaching the clamp assembly 38 of FIG. 4. The clamp assembly 38 includes an approximate U-shaped body 40 having an upper portion 42 being affixed to ribs 14 by bolt assembly 44 extending through hole 36. The bottom portion 46 of the clamp assembly 38 projects beneath a section of an I-beam 18. A threaded member 48 extends through a hole 50 formed in the lower portion 46 and a cooperating nut 52 to clamp the frame structure to the supporting I-beams. A clamp assembly 38 may be employed at each of I-beams 18 by being attached to as many of the ribs 14 as necessary for securement.

As illustrated in FIG. 3, the cross frame members 12 are formed with open areas 54 so that the lower edge of the frame members 12 is spaced above the upper surface of I-beams 18. This permits free flow of liquid wash through the open areas 54 between adjacent tray assemblies to provide optimum cleaning. As further seen in FIG. 4, the bottom edges 56 of ribs 14 are spaced above the I-beams 18 to create additional open areas 58. The open ares 58 allow additional flow of wash to flush the tray assemblies 2 and I-beams 18.

Referring to FIG. 6 to 12 there is illustrated another embodiment of tray assemblies of the invention, generally designated by reference numeral 100. The tray assembly 100 includes a perforated tray sheet 102 (FIG. 6) such as described in the preceding embodiment with reference to FIGS. 1 to 5. The tray sheet 102 is affixed to a tray frame 104 by spot welding and the like. The frame includes a pair of side frame members 106. A pair of cross frame members 108 are connected to the ends of the side frame members 106. A plurality of longitudinal reinforcing rods 110 extend in parallel relationship to side members 106 between cross frame members 108. Two rows of reinforcing bars 112 extend laterally across the frame 104 in similar manner as the previous embodiment. The height of the side frame members 106, cross members 108, and reinforcing rods 110 are all equal in contrast to the embodiment of FIGS. 6–12. Free flow of wash liquid during cleaning is provided by unique risers in accordance with the invention to be described. The tray assemblies 100 are affixed together in a side by side relationship by bolt assemblies (not shown) through holes 106a (FIG. 9) in inside members 106 as in preceding embodiments.

In a first embodiment, as best shown in FIGS. 8, 10, and 17 to 20, a pair of slip-on risers 120 are shown to elevate the tray frame 102 from I-beam 18 at two postions at each of the tray assemblies. The slip-on riser 120 is intended to be used at positions on I-beams 18 between adjacent tray assemblies 100 and may be attached to the I-beams 18 by bolts (not shown) through elongated hole 121 that allows some adjustment of position. The slip-on risers 120 include a casting 122 having an enlarged base 124. The top of casting includes a modified U-shaped configuration having upward opening arms 126, 128 and base 129 to provide cavity 130 to receive the side beams 108 and bent down end portions 102' of adjacent tray sheets 102.

The bolted position of the end to end relationship of tray assemblies 100 are supported by additional risers 140 shown in FIGS. 8, 11, and 13 to 16. As in the previous embodiment, the end of a tray assembly 100 is bolted to another tray assembly by bolt assemblies 142 through holes 144 in cross members 108 (FIG. 9). The ends 102' of the tray sheets 102 are sandwiched between the cross frame members 108 as previously described.

In addition, the riser 140 includes a base 146 and an upper vertical plate 148 as shown in FIGS. 11, and 13 to 16. The base 146 forms a saddle surface 148' for the cross members 108. The plate 148 includes a hole 150 to receive a bolt assembly 142 which also extends through the frame members 108 and bent down portion 102'. Another elongated slot 151 is formed through base 146 for attachment to the I-beam 18 by a bolt (not shown) and allows limited adjustment of the position of the riser 140. The riser 140 is positioned adjacent to two bolt interconnections between the adjacent ends of the tray assemblies.

In another embodiment as shown in FIGS. 12, and 21 to 25, an alternate pair of risers 160 are connected to the side frame members 106 in contacting side beams 106. Each riser 160 is formed as a casting 162 having a cutout saddle surface 164 and hole 165. A bolt assembly 166 extending through hole 165 located beneath the frame 102 affixes the pair of risers 160 together clamping them to the adjacent frame 102. (FIG. 25). The saddle surface 164 is disposed beneath the side frame members 106 of adjacent frames 102 to elevate the side frame members 106. The pair of risers 160 at each position bear against each other beneath beams 106 at surfaces 170. The saddle portion 164 is defined by a pair of upper offset portions 174. As seen in FIG. 25, the risers 160 are used in conjuction with previously described risers 120.

In both alternative arrangements in FIG. 8 and FIG. 25, the risers are particularly useful in situations where the height of the frame 104 is shallow, compared to the greater height of the frame structure 8 of the embodiment of FIGS. 1 to 5. It is commonly preferred that the vertical position of the germination floor be at a height dictated by deep frames, such as, for example, approximately four inches above the I-beam 18 as provided by the frame structure 8 of FIG. 3. The height of frame 104 with the risers herein disclosed elevate the tray sheets 102 to approximately the height dictated by a deep tray assembly. This elevated position of tray frame 104 also provides enhanced circulation of liquid wash during cleaning between adjacent trays through I-beams 18 for increased cleaning of both.

What is claimed is:

1. The tray assemblies for the floor of a germination compartment comprising:

a plurality of frame means having a top surface and a lower surface, said frame means including a pair of spaced side members interconnected with a pair of cross members, said frame means further including a plurality of spaced rib members extending parallel to said side members, said rib members being attached at each end to said cross members, a perforated tray sheet being affixed to the top of each of said plurality of said frame means, said lower surface being arranged to be carried by cross supporting beams located beneath said cross member, riser means positioned between said frame means and the supporting beams to raise said plurality of frame means above the supporting beams, said riser means having a base disposed in contacting relationship beneath one of said cross members of said frame means and one of said cross members of a said adjacent frame means, and said riser means further having means contacting said frame means and said adjacent frame means at a position above said base.

2. The tray assemblies for the floor of a germination compartment comprising:

a plurality of frame means having a top surface and a lower surface, said frame means including a pair of spaced side members interconnected with a pair of cross members, said frame means further including a plurality of spaced rib members extending parallel to said side members, said rib members being attached at each end to said cross members, a perforated tray sheet being affixed to the top of each of said plurality of said frame means, said lower surface being arranged to be carried by cross supporting beams located beneath said cross members, and riser means positioned between said frame means and the supporting beams to raise said plurality of frame means above the supporting beams, said riser means includes a plurality of first riser members each having a base disposed on the supporting beams, each of said riser members further having an upper portion disposed adjacent to the cross member of one of said frame means, bolt means extending respectively through said upper portion of said cross member of one of said frame means and the cross member of an adjacent one of said frame means to affix said one and said adjacent one of said frame means in end to end relationship.

3. The tray assemblies according to claim 2 wherein said perforated tray sheet of each of said plurality of frame means includes an edge portion bent down between said one and said adjacent one of said frame means.

4. The tray assemblies according to claim 3 further including a plurality of second riser members positioned between each of said cross members and a respective supporting beam in spaced relationship to said first riser members, said second riser member having a base carried by a respective support beam, said second riser further including an upward opening U-shaped portion to receive the bottom of one of said cross frames of said one and said adjacent one of said frame means.

5. The tray assemblies for the floor of a germination compartment comprising:
- a plurality of frame means having a top surface and a lower surface, said frame means including a pair of spaced side members interconnected with a pair of cross members,
- said frame means further including a plurality of spaced rib members extending parallel to said side members, said rib members being attached at each end to said cross members,
- a perforated tray sheet being affixed to the top of each of said plurality of said frame means,
- said lower surface being arranged to be carried by cross supporting beams located beneath said cross members, and
- riser means positioned between said frame means and the supporting beams to raise said plurality of frame means above the supporting beams,
- said riser means includes a plurality of pairs of riser members,
- said pairs of riser members having bottom portions carried by a respective supporting beam,
- said pairs of riser members being disposed on opposite sides of the side members of adjacent frame means,
- bolt means for affixing said pairs of riser members to said side members of adjacent frame means, and
- said riser members forming a surface beneath the cross members of adjacent frame means.

* * * * *